United States Patent
Shibata et al.

(10) Patent No.: US 9,196,025 B2
(45) Date of Patent: Nov. 24, 2015

(54) IMAGE PROCESSING APPARATUS, IMAGE PROCESSING METHOD AND IMAGE PROCESSING PROGRAM

(75) Inventors: Takashi Shibata, Tokyo (JP); Akihiko Iketani, Tokyo (JP); Shuji Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 907 days.

(21) Appl. No.: 13/395,820

(22) PCT Filed: Sep. 9, 2010

(86) PCT No.: PCT/JP2010/005517
§ 371 (c)(1),
(2), (4) Date: Mar. 23, 2012

(87) PCT Pub. No.: WO2011/033744
PCT Pub. Date: Mar. 24, 2011

(65) Prior Publication Data
US 2012/0170861 A1    Jul. 5, 2012

(30) Foreign Application Priority Data

Sep. 15, 2009  (JP) .................... 2009-213524

(51) Int. Cl.
| | |
|---|---|
| *G06T 5/50* | (2006.01) |
| *G06K 9/62* | (2006.01) |
| *G06T 3/40* | (2006.01) |
| *G06T 5/00* | (2006.01) |
| *H04N 1/40* | (2006.01) |

(52) U.S. Cl.
CPC . *G06T 5/50* (2013.01); *G06K 9/627* (2013.01); *G06K 9/6277* (2013.01); *G06T 3/4076* (2013.01); *G06T 5/003* (2013.01); *H04N 1/40* (2013.01); *G06T 2207/20012* (2013.01); *G06T 2207/20076* (2013.01)

(58) Field of Classification Search
None
See application file for complete search history.

(56) References Cited

U.S. PATENT DOCUMENTS

| | | | |
|---|---|---|---|
| 6,766,067 B2 * | 7/2004 | Freeman et al. | 382/299 |
| 2004/0164996 A1 * | 8/2004 | Criminisi et al. | 345/619 |

(Continued)

OTHER PUBLICATIONS

Zoran, Daniel, and Yair Weiss. "From learning models of natural image patches to whole image restoration." Computer Vision (ICCV), 2011 IEEE International Conference on. IEEE, 2011.*

(Continued)

*Primary Examiner* — Kim Vu
*Assistant Examiner* — Nathan Bloom
(74) *Attorney, Agent, or Firm* — Young & Thompson

(57) ABSTRACT

In an image processing apparatus, a conditional probability calculating element calculates the probability of existence of an attribute as to each region in an input degraded image, for each attribute. Optimization function determining element uses a conditional probability calculated by the conditional probability calculating element with regard to each region in the degraded image for each attribute, a-priori knowledge defined as a conditional probability of appearance of an attribute in a region of a candidate of a restored image when there is the attribute in the region, and the input degraded image to determine an optimization function using the candidate of the restored image as a variable and yielding a smaller value as the candidate of the restored image is closer to a true restored image. Restored image determining element adopts the candidate of the restored image with which the optimization function yields a minimum value as the restored image.

12 Claims, 7 Drawing Sheets

(56) References Cited

U.S. PATENT DOCUMENTS

2007/0041663 A1* 2/2007 Cho et al. ............. 382/299
2009/0274385 A1* 11/2009 Zhu et al. ............. 382/264

OTHER PUBLICATIONS

Deledalle, C.-A.; Denis, L.; Tupin, F., "Iterative Weighted Maximum Likelihood Denoising With Probabilistic Patch-Based Weights," Image Processing, IEEE Transactions on , vol. 18, No. 12, pp. 2661,2672, Dec. 2009.*

Lazebnik, S.; Raginsky, M., "An empirical Bayes approach to contextual region classification," Computer Vision and Pattern Recognition, 2009. CVPR 2009. IEEE Conference on , vol., No., pp. 2380,2387, Jun. 20-25, 2009.*

Roth, S.; Black, M.J., "Fields of Experts: a framework for learning image priors," Computer Vision and Pattern Recognition, 2005. CVPR 2005. IEEE Computer Society Conference on , vol. 2, No., pp. 860,867 vol. 2, Jun. 20-25, 2005.*

International Search Report, PCT/JP2010/005517, Oct. 5, 2010.

Baker, S. et al., Limits on super-resolution and how to break them, Computer Vision and Pattern Recognition, 2000. Proceedings. IEEE Conference on , Jun. 2000, vol. 2, p. 372-379.

Roth, S. et al., Fields of Experts: a framework for learning image priors, Computer Vision and Pattern Recognition, 2005. CVPR 2005. IEEE Computer Society Conference on, Jun. 2005, vol. 2, p. 860-867.

Takahiro Ogawa, Miki Haseyama, Hideo Kitajima, "Restoration of Missing Intensities of Still Images Using GMRF Model", The Transactions of the Institute of Electronics, Information and Communication Engineers, Jun. 1, 2006, vol. J89-D, No. 6, pp. 1327 to 1335.

Baker et al., "Limits on Super-Resolution and How to Break Them". IEEE Computer Society Conference on vol. 2, pp. 860-867, Jun. 2005.

* cited by examiner

FIG. 2
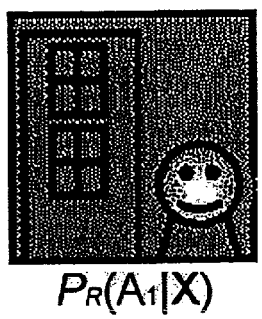
(a) $P_R(A_1|X)$
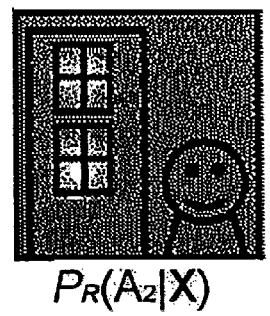
(b) $P_R(A_2|X)$
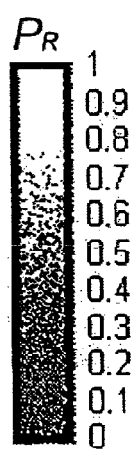
(e) $P_R$
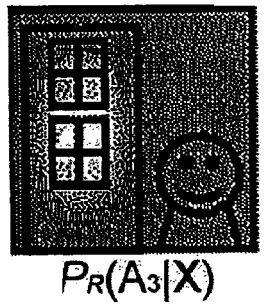
(c) $P_R(A_3|X)$
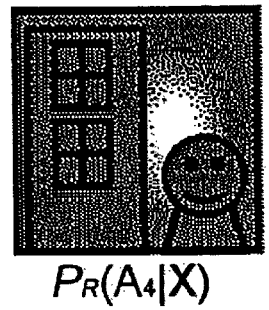
(d) $P_R(A_4|X)$

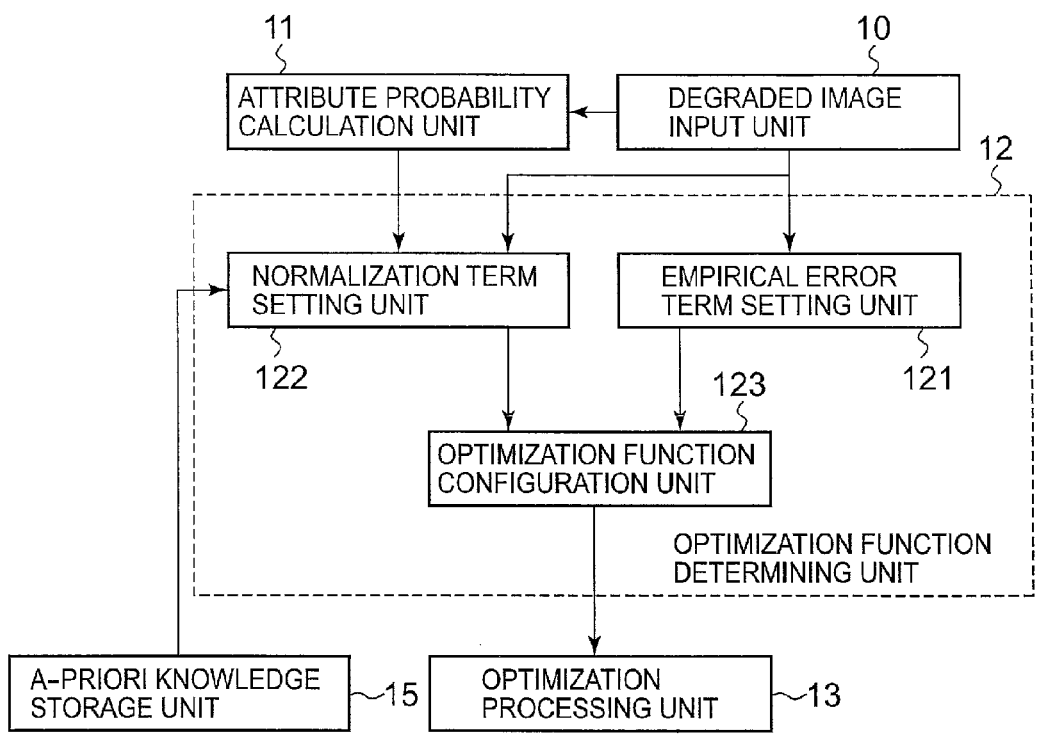

FIG. 6

$$B = \begin{bmatrix} 1/9 & 1/9 & 1/9 & 0 & 0 & 0 & 1/9 & 1/9 & 1/9 & 0 & 0 & 0 & 1/9 & 1/9 & 1/9 & 0 & \cdots & 0 & 0 & 0 & 0 & 0 & 0 & 0 & 0 & 0 & 0 & 0 \\ 0 & 1/9 & 1/9 & 1/9 & 0 & 0 & 0 & 1/9 & 1/9 & 1/9 & 0 & 0 & 0 & 1/9 & 1/9 & 1/9 & \cdots & 0 & 0 & 0 & 0 & 0 & 0 & 0 & 0 & 0 & 0 & 0 \end{bmatrix}$$

IMAGE PROCESSING APPARATUS, IMAGE PROCESSING METHOD AND IMAGE PROCESSING PROGRAM

TECHNICAL FIELD

The present invention relates to an image processing apparatus, an image processing method, and an image processing program, and more particularly, an image processing apparatus, an image processing method, and an image processing program for restoring a degraded image.

BACKGROUND ART

A generally-used method for restoring a degraded image degraded due to blur, noise, and low resolution includes MAP estimation (Maximum a Posteriori Estimation). The MAP estimation is a method to obtain an optimized result using a-priori knowledge about an amount to be estimated. Therefore, in the MAP estimation, it is important what kind of a-priori knowledge is used. For example, NPLs 1, 2 describe methods for restoring a degraded image by obtaining a-priori knowledge through learning and performing MAP estimation.

NPL 1 describes a method for specializing in restoring a facial image, obtaining a-priori knowledge about a facial image through learning, and performing MAP estimation based on the a-priori knowledge. In addition, the NPL 1 also describes a case for specializing in restoring a character image, obtaining a-priori knowledge about a character image through learning, and performing MAP estimation based on the a-priori knowledge.

NPL 2 describes a method for restoring a general image, and the method includes obtaining a-priori knowledge about a general image through learning and performing MAP estimation based on the a-priori knowledge.

CITATION LIST

Non Patent Literature

NPL 1: Simon Baker, Takeo Kanade, "Limits on Super-Resolution and How to Break Them", IEEE TRANSACTIONS ON PATTERN ANALYSIS AND MACHINE INTELLIGENCE, VOL. 24, NO. 9, September 2002

NPL 2: Stefan Roth, Michael J. Black, "Fields of Experts: A Framework for Learning Image Priors", Computer Vision and Pattern Recognition, 2005. CVPR2005. IEEE Computer Society Conference on Volume 2, pp. 860-867, June 2005

SUMMARY OF INVENTION

Technical Problem

In the method described in NPL 1, the MAP estimation is performed based on the detailed a-priori knowledge of structural information about a face and the like, so that a high-quality restored image can be obtained from the degraded image. However, the method is specialized in restoring facial images (or character images), and therefore, images that can be restored are limited.

On the other hand, in the method described in NPL 2, images that can be restored are not limited. However, the method uses a-priori knowledge that can be applied to all images. As a result, the effect of improving the image quality is reduced.

Accordingly, it is an object of the present invention to provide an image processing apparatus, an image processing method, and an image processing program capable of obtaining a high-quality restored image from a degraded image without limiting an image to be restored.

Solution to Problem

An image processing apparatus according to the present invention includes conditional probability calculating means for calculating, as a conditional probability, a probability of existence of an attribute with regard to each region in an input degraded image, for each attribute, i.e., an element defined in advance as an element that can exist within the degraded image, optimization function determining means for determining an optimization function using a candidate of a restored image as a variable and yielding a smaller value as the candidate of the restored image is closer to a true restored image by using a conditional probability calculated by the conditional probability calculating means with regard to each region in the degraded image for each attribute, a-priori knowledge defined as a conditional probability of appearance of an attribute in a region of the candidate of the restored image when there is the attribute in the region, and the input degraded image, and restored image determining means for identifying the candidate of the restored image with which the optimization function yields a minimum value, and adopting the candidate as the restored image of the degraded image.

An image processing method according to the present invention comprises calculating, as a conditional probability, a probability of existence of an attribute with regard to each region in an input degraded image, for each attribute, i.e., an element defined in advance as an element that can exist within the degraded image, determining an optimization function as a variable and yielding a smaller value as a candidate of the restored image is closer to a true restored image by using a conditional probability calculated with regard to each region in the degraded image for each attribute, a-priori knowledge defined as a conditional probability of appearance of an attribute in a region of the candidate of the restored image when there is the attribute in the region, and the input degraded image; and identifying the candidate of the restored image with which the optimization function yields a minimum value to adopt the candidate as the restored image of the degraded image.

An image processing program according to the present invention causes a computer to execute conditional probability calculating processing for calculating, as a conditional probability, a probability of existence of an attribute with regard to each region in an input degraded image, for each attribute, i.e., an element defined in advance as an element that can exist within the degraded image, optimization function determining processing for determining an optimization function as a variable and yielding a smaller value as a candidate of the restored image is closer to a true restored image by using a conditional probability calculated with regard to each region in the degraded image for each attribute, a-priori knowledge defined as a conditional probability of appearance of an attribute in a region of the candidate of the restored image when there is the attribute in the region, and the input degraded image, and restored image determining processing for identifying the candidate of the restored image with which the optimization function yields a minimum value, and adopting the candidate as the restored image of the degraded image.

Advantageous Effects of Invention

According to the present invention, a high-quality restored image can be obtained from a degraded image without limiting an image to be restored.

BRIEF DESCRIPTION OF DRAWINGS

FIG. 2 It depicts a schematic explanatory diagram illustrating a conditional probability distribution about attributes in a degraded image.

FIG. 3 It depicts a block diagram illustrating an example of an optimization function determining unit.

FIG. 4 It depicts an explanatory diagram illustrating an example of an image of a target of blur.

FIG. 6 It depicts an explanatory diagram illustrating an example of a matrix B representing degradation due to blur.

DESCRIPTION OF EMBODIMENTS

Hereinafter, an embodiment of the present invention will be explained with reference to drawings.

Figure 1:
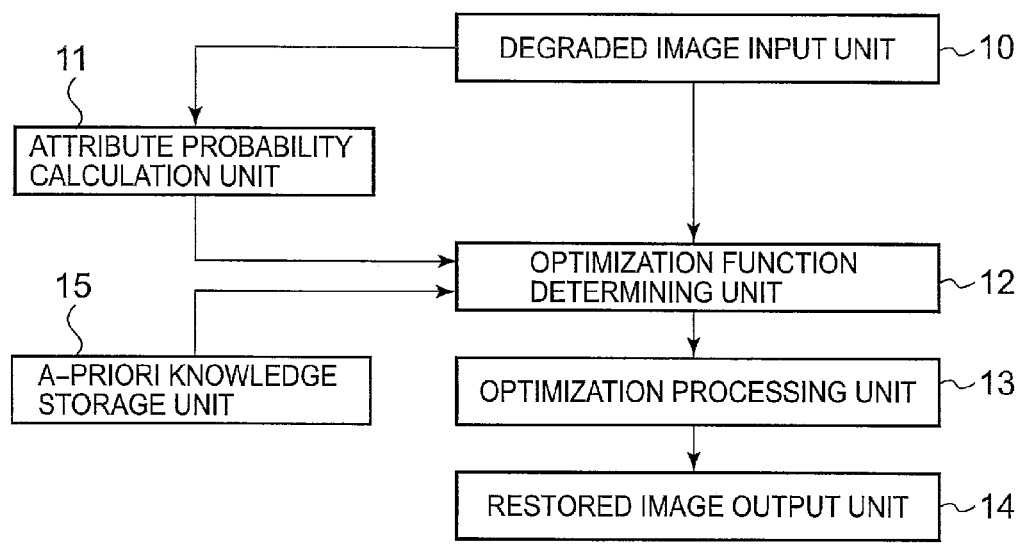
FIG. 1 It depicts a block diagram illustrating an example of an image processing apparatus according to the present invention.

FIG. 1 is a block diagram illustrating an example of an image processing apparatus according to the present invention. An image processing apparatus according to the present invention includes a degraded image input unit 10, an attribute probability calculation unit 11, an optimization function determining unit 12, an optimization processing unit 13, a restored image output unit 14, and an a-priori knowledge storage unit 15. In the explanation below, for example, the image processing apparatus according to the present invention expresses an image using vectors, and performs calculation using the vector. More specifically, in the explanation below, for example, the image processing apparatus according to the present invention treats an image as a row vector in which pixel values are arranged in a predetermined order. In this case, for example, an image is expressed as a row vector in which pixel values are arranged in the order of raster scan. However, it should be understood that treating an image as a vector is merely an example of the present invention, and in the present invention, an image may be expressed in a format other than the vector (for example, matrix and the like).

The degraded image input unit 10 is an input device receiving a degraded image to be restored. The form of input of the degraded image is not particularly limited. The degraded image that is input to the image processing apparatus according to the present invention is not limited to an image obtained by taking a picture of a particular subject, either.

The attribute probability calculation unit 11 calculates what kind of attributes exist in the degraded image that is input to the degraded image input unit 10. More specifically, this processing is processing for obtaining, as a conditional probability, a probability of existence of each attribute in each region in the degraded image.

An attribute is an element previously defined as an element that may exist in the degraded image (i.e., an element that may exist in the image). Examples of attributes (elements) include objects that can be subjects such as a person, the face of the person, and a building, and characters, background, and the like that are taken together with a subject. In addition, distinctive parts appearing in the image such as an edge (a region where the luminance gradient thereof is high) and a corner (a region where it is formed an angle) also correspond to attributes (elements). The types of attributes are defined in advance. It is assumed that the received degraded image is denoted as X. It is also assumed that K types are defined as the types of attributes, and the i-th attribute thereof is denoted as $A_i$. It should be noted that i is $1, \ldots, K$. It is also assumed that a region in the image is denoted as R. For each attribute in each region of the degraded image X, the attribute probability calculation unit 11 obtains a conditional probability $P(A_i|X, R)$ of existence of an attribute $A_i$ for each region R in the degraded image X.

FIG. 2 is an explanatory diagram schematically illustrating a conditional probability distribution about attributes in the degraded image using an example of four different attributes. In FIG. 2(a), a face of a person is defined as an attribute $A_1$, and FIG. 2(a) shows a distribution of high portions and low portions of the conditional probability of existence of the attribute $A_1$. FIG. 2(e) shows a relationship between a conditional probability and a gradation of color schematically shown in FIG. 2, and indicates that the higher the conditional probability is, the whiter the used color is, and the lower the conditional probability is, the darker the used color is. FIG. 2(a) indicates that a region corresponding to the face of the person has a high conditional probability $P(A_1|X, R)$. Likewise, in FIG. 2(b), a window is defined as an attribute $A_2$, and FIG. 2(b) shows a distribution of a conditional probability of existence of the attribute $A_2$. FIG. 2(b) indicates that a region corresponding to the window has a high conditional probability $P(A_2|X, R)$. In FIG. 2(c), a building is defined as an attribute $A_3$, and FIG. 2(c) shows a distribution of a conditional probability of existence of the attribute $A_3$. FIG. 2(c) indicates that a region corresponding to the building has a high conditional probability $P(A_3|X, R)$. In FIG. 2(d), a background is defined as an attribute $A_4$, and FIG. 2(d) shows a distribution of a conditional probability of existence of the attribute $A_4$. FIG. 4(d) indicates that a region corresponding to the background has a high conditional probability $P(A_4|X, R)$.

It should be noted that how the regions R are defined in the image is not particularly limited. For example, each pixel in the image may be defined as a region R. In this case, each region R may be represented using a pixel number for distinguishing the pixel. Alternatively, a region including a plurality of pixels may be defined as a region R. In this case, the region R can be expressed as a set of pixel numbers. Moreover, the size of a region R may be changed according to a range to which attention is given. Still alternatively, the entire image may be defined as a region R.

For example, the attribute probability calculation unit 11 may calculate the degree of similarity between a region R extracted from the image and a template defined in advance for each attribute, and may obtain a conditional probability $P(A_i|X, R)$ from the degree of similarity. In this case, a function of obtaining the conditional probability $P(A_i|X, R)$ using the degree of similarity as a variable is defined for each attribute in advance, and the attribute probability calculation unit 11 may calculate the conditional probability P ($A_i$|X, R) by substituting the degree of similarity into the function. However, the algorithm for calculating the conditional probability P ($A_i$|X, R) is not particularly limited. Alternatively, the conditional probability P ($A_i$|X, R) may be calculated by other methods.

The optimization function determining unit 12 determines an optimization function for determining a restored image by using the input degraded image X, the conditional probability P ($A_i$|X, R) calculated by the attribute probability calculation unit 11, and the a-priori knowledge defined in advance. In the optimization function, a candidate of the restored image is used as a variable, and as the candidate of the restored image is closer to the true restored image (i.e., as the candidate of the restored image is similar thereto), the value of the function decreases. Hereinafter, the optimization function is represented as an E(Y). Y means the candidate of the restored image substituted into the optimization function as a variable, and the specific configuration of the optimization function determining unit 12 will be explained later.

The a-priori knowledge storage unit 15 is a storage device for storing a-priori knowledge used to determine the optimization function by the optimization function determining unit 12.

The optimization processing unit 13 calculates a candidate Y of the restored image for minimizing the value of the optimization function E(Y), and adopts the candidate Y as the restored image.

The restored image output unit 14 is an output device for outputting the restored image determined by the optimization processing unit 13. For example, the restored image output unit 14 is achieved with a display device displaying the restored image. However, the display device is an example of the restored image output unit 14. Alternatively, the restored image output unit 14 may be an output device for outputting the restored image in a form other than display.

Subsequently, an example of optimization function and an example of configuration of the optimization function determining unit 12 will be explained. In the present embodiment, the optimization function is represented as a summation of two terms. The first term is a term representing a difference between the actually received degraded image X and the image degrading the candidate Y of the restored image. Hereinafter, the first term will be referred to as an empirical error term. In the second term, attention is given to each of the attributes, and when an evaluation function for an attribute to which attention is given and indicating a small value when there is the attribute to which attention is given in the image is sought, the second term is a summation of the evaluation functions of the respective attributes. This evaluation function is a function using Y is a variable. This evaluation function may also be referred to as energy. Hereinafter the second term will be referred to as a normalization term. The empirical error term becomes a smaller value as the candidate Y of the restored image becomes closer to the true restored image. The normalization term is provided to stabilize a solution when the solution (the true restored image) is obtained from the optimization function. When the optimization function is represented with only the empirical error term, there are numerous number of solutions that can be made by the optimization processing unit 13, and the solution becomes unstable. Accordingly, not only the empirical error term but also the normalization term are used to represent the optimization function, so that a solution is limited from among the numerous number of solutions, whereby the solution can be stabilized.

FIG. 3 is a block diagram illustrating an example of the optimization function determining unit 12. The optimization function determining unit 12 includes an empirical error term setting unit 121, a normalization term setting unit 122, and an optimization function configuration unit 123. It should be noted that FIG. 3 also shows the degraded image input unit 10, the attribute probability calculation unit 11, the a-priori knowledge storage unit 15, and the optimization processing unit 13.

The empirical error term setting unit 121 determines the empirical error term by using the degraded image X that is input to the degraded image input unit 10. For example, the empirical error term setting unit 121 may define the empirical error term as shown in the following expression (1).

$$E_{data}(Y,X) = |B \cdot Y - X|^2 \qquad \text{Expression (1)}$$

$E_{data}(Y, X)$ is the empirical error term. B is a matrix representing progress of degradation of the restored image. In $E_{data}(Y, X)$ defined by the empirical error term setting unit 121, Y is a vector variable. As the restored image candidate Y, i.e., variable, becomes closer to the true restored image, the value of the empirical error term $E_{data}(Y, X)$ decreases.

The matrix B representing progress of degradation of the restored image may be a matrix representing a low-pass filter representing camera blur, for example. Hereinafter, a specific example of matrix B will be explained using an example where the matrix B is the matrix representing degradation caused by camera blur (blur) as described above.

Figure 5:
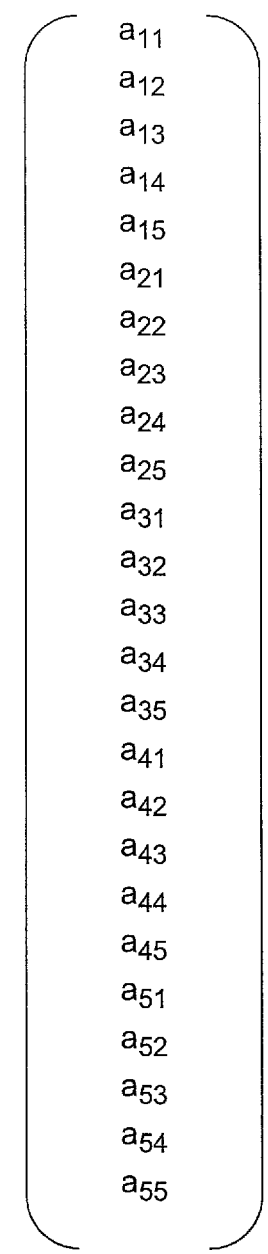
FIG. 5 It depicts an explanatory diagram illustrating a row vector representing an image as shown in FIG. 4 as an example.

An example of simulation of blur will be explained with reference to FIGS. 4 to 6. The blur can be simulated by replacing, for each pixel in the image, the pixel value with a mean value of the pixel values of other pixels in proximity. FIG. 4 shows an example of an image of a target of blur, and FIG. 4 shows 5×5 pixel image as an example. For example, when attention is given to a pixel of a pixel value $a_{22}$, the pixel value of the pixel in question is replaced with a mean value of the pixel value $a_{22}$ and pixel values $a_{11}$, $a_{12}$, $a_{13}$, $a_{21}$, $a_{23}$, $a_{31}$, $a_{32}$, $a_{33}$ of pixels in proximity thereto. For example, when attention is given to a pixel of a pixel value $a_{23}$, the pixel value of the pixel in question is replaced with a mean value of the pixel value $a_{23}$ and pixel values $a_{12}$, $a_{13}$, $a_{14}$, $a_{22}$, $a_{24}$, $a_{32}$, $a_{33}$, $a_{34}$ of pixels in proximity thereto. Likewise, pixel values of other pixels are also replaced, so that blur can be simulated. FIG. 5 is an explanatory diagram illustrating a row vector representing an image as shown in FIG. 4 as an example. FIG. 5 is a row vector representing the image as shown in FIG. 4 as an example. FIG. 6 is an example of a matrix B representing degradation due to blur. However, FIG. 6 shows elements for two lines of the matrix B, and other lines are omitted from FIG. 6. In FIG. 6, among the two lines shown specifically, the first line will be referred to as the k-th line for the sake of convenience, and the line subsequent thereto will be referred to as the k+1-th line.

The image as shown in FIG. 4 can be represented as the row vector as shown in FIG. 5. Accordingly, the matrix as shown in FIG. 6 as an example may be used as the matrix B by which this row vector is multiplied in order to simulate blur. The k-th line as shown in FIG. 6 includes matrix components used for replacing the pixel value $a_{22}$. The k+1-th line as shown in FIG. 6 includes matrix components used for replacing the pixel value $a_{23}$. As described above, in FIG. 6, the other lines are omitted. The mean value of each pixel can be calculated by multiplying the row vector as shown in FIG. 5 by the matrix B as shown in FIG. 6 from the right side. This is also applicable to calculation of other lines of the matrix B as shown in FIG. 6. Therefore, the matrix B representing degradation due to blur may be defined to satisfy the following conditions, for example. The first condition is that each line corresponds to each pixel in the image. The second condition is that, where the number of pixels used for calculating mean values is n, the value of each component in each line is 1/n when the pixel value multiplied by the component is the pixel value of the pixel corresponding to the line and pixels in proximity thereto, and the value of each component in each line is 0 when the pixel value multiplied is the pixel value of pixels other than the pixel corresponding to the line and pixels in proximity thereto. It should be noted that the above conditions are merely example. Alternatively, for example, the values of each line of the matrix B may be equal, and the matrix B may also be set to satisfy other conditions, e.g., the values may be set, e.g., based on normal distribution.

However, the method for defining the matrix B in the expression (1) is not limited to the above method, and may be defined according to other methods. For example, a matrix representing degradation due to factors other than blur may be defined as the matrix B.

In this case, the method for determining the empirical error term using the expression (1) has been explained. However, in order to improve the robustness against abnormal values existing in the degraded image X, the empirical error term setting unit 121 may also determine the empirical error term as shown in the expression (1)' below.

$$E_{data}(Y,X)=|B\cdot Y-X|^q \qquad \text{Expression (1)'}$$

In the expression (1)', q is a real number satisfying q>0. For example, q=1 may hold.

The normalization term setting unit 122 determines the normalization term by using the degraded image X that is input to the degraded image input unit 10, the conditional probability P ($A_i$|X, R) calculated by the attribute probability calculation unit 11, and the a-priori knowledge. The normalization term is expressed as shown in the expression (2) below.

[Math. 1]

$$E_{reg}(Y)=\Sigma_i E_i(Y) \qquad \text{Expression (2)}$$

$E_{reg}(Y)$ is a normalization term. As explained above, in the normalization term, attention is given to each of the attributes, and when an evaluation function for an attribute to which attention is given and indicating a small value when there is the attribute to which attention is given in the image is sought, the normalization term is a summation of the evaluation functions of the respective attributes. In the expression (2), $E_i(Y)$ is the evaluation function for each attribute, the right-hand side of the expression (2) represents the total summation thereof.

$E_i(Y)$ is represented by the conditional probability P ($A_i$|X, R) calculated by the attribute probability calculation unit 11 and the a-priori knowledge P (Y|$A_i$, R) stored in the a-priori knowledge storage unit 15. The a-priori knowledge P (Y|$A_i$, R) represents, as a conditional probability, a probability of existence of attribute $A_i$ in the region R of the candidate Y of the restored image when the attribute $A_i$ exists in the region R. For example, it is assumed that the I-th attribute, i.e., $A_I$, is the attribute of the face of a person. In this case, as the pixel value of the region R of the candidate Y of the restored image becomes closer to the state representing the face of the person, the value of P(Y|$A_I$, R) becomes larger. This kind of a-priori knowledge P (Y|$A_i$, R) is, for example, obtained through learning in advance using the method described in NPL 2 and is stored to the a-priori knowledge storage unit 15.

An example of the a-priori knowledge P (Y|$A_i$, R) will be shown. The a-priori knowledge P (Y|$A_i$, R) is defined as a function of the image Y. For example, the a-priori knowledge P (Y|$A_i$, R) may be defined as a function of Y as shown in the expression (3) as an example.

[Math. 2]

$$P(Y|A_i, R) = \frac{1}{Z}\prod_k^N \left(1 + \frac{1}{2}(J_{ki}(R)\cdot Y)^2\right)^{-\alpha_{ki}} \qquad \text{Expression (3)}$$

In the expression (3), k is a value for identifying each configuration unit included in the attribute, and N is the total number of configuration units included in the attribute. Examples of configuration units included in the attribute include configuration units such as a right eye, a left eye, and a mouth when, for example, the attribute is the face of a person. When the attribute does not include a plurality of configuration units such as a right eye and a left eye, and the entire attribute can be understood as one configuration unit, N is 1. $J_{ki}(R)$ is a matrix representing a filter in the region R for detecting the k-th configuration unit of the attribute $A_i$. As the value of $J_{ki}(R)\cdot Y$ is larger, this means that there is a portion which appears to be the configuration unit in the region R in the image Y. For example, it is assumed that the attribute $A_i$ is the face of the person, and among the configuration units included in the attribute, the k-th configuration unit is the right eye. In this case, as the value of $J_{ki}(R)\cdot Y$ is larger, this means that there is a portion which appears to be the right eye of the face of the person in the region R in the image Y. This kind of filter $J_{ki}(R)$ is defined for each configuration unit of each attribute. Further, $\alpha_{ki}$ is a coefficient defining the weight of the following portion corresponding to the 1-th to N-th configuration units in the expression (3).

$$(1+\tfrac{1}{2}(J_{ki}(R)\cdot Y)^2)) \qquad \text{[Math. 3]}$$

Further, there is a limitation that the probability becomes 1 when integrated in the entire image. Z in the right-hand side of the expression (3) is a normalization constant for making this limitation effective.

In the expression (3), $J_{ki}(R)$ and $\alpha_{ki}$ may be defined in advance through learning. For example, a learning image obtained by taking an attribute $A_i$ (learning data) is prepared, and from the learning data, $J_{ki}(R)$ and $\alpha_{ki}$ about each configuration unit may be obtained through learning. Then, for example, the a-priori knowledge P (Y|$A_i$, R) expressed as a function of Y as shown in the expression (3) is defined for each attribute.

The normalization term setting unit 122 may define a decreasing function of the conditional probability P ($A_i$|X, R) and the a-priori knowledge P (Y|$A_i$, R) for each region R, and may define an evaluation function of each attribute as a summation of the functions of the respective regions. For example, the decreasing function of the conditional probability P ($A_i$|X, R) and the a-priori knowledge P (Y|$A_i$, R) may be made by defining a function for multiplying a product of logarithm of P(Y|$A_i$, R) and P($A_i$|X, R) by −1. In this example, the normalization term setting unit 122 defines the evaluation function $E_i(Y)$ for the i-th attribute $A_i$ as shown in the following expression (4).

[Math. 4]

$$E_i(Y)=-\Sigma_R P(A_i|X,R)\cdot\log\{P(Y|A_i,R)\} \qquad \text{Expression (4)}$$

In the above example, the function for each region is −P($A_i$|X, R)·log {P(Y|$A_i$, R)}. When there is the attribute in the region in question, the value of this function decreases.

The normalization term setting unit 122 may define the normalization term $E_{reg}(Y)$ as shown in the expression (2) as a summation of evaluation functions defined as shown in the expression (4) for the respective attributes.

It should be noted that the normalization term is provided to stabilize the solution obtained by optimizing (minimizing) the optimization function E(Y).

The optimization function configuration unit 123 define the optimization function E(Y) as a summation of the empirical error term $E_{data}(Y, X)$ and the normalization term $E_{reg}(Y)$. In other words, the optimization function configuration unit 123 defines the optimization function E(Y) as shown in the expression (5) shown below.

$$E(Y)=E_{data}(Y,X)+E_{reg}(Y) \qquad \text{Expression (5)}$$

The attribute probability calculation unit 11, the optimization function determining unit 12 (the empirical error term setting unit 121, the normalization term setting unit 122, and the optimization function configuration unit 123), and the optimization processing unit 13 are achieved with a CPU of a computer that operates in accordance with, for example, an image processing program. In this case, a program storage device (not shown) of the computer may store the image processing program, and the CPU may read the program, and may operate in accordance with the program to serve as the attribute probability calculation unit 11, the optimization function determining unit 12 (the empirical error term setting unit 121, the normalization term setting unit 122, and the optimization function configuration unit 123), and the optimization processing unit 13. Alternatively, the attribute probability calculation unit 11, the optimization function determining unit 12, and the optimization processing unit 13 may be achieved as separate pieces of hardware. The empirical error term setting unit 121, the normalization term setting unit 122, and the optimization function configuration unit 123 may also be achieved as separate pieces of hardware.

Subsequently, operation will be explained.

Figure 7:
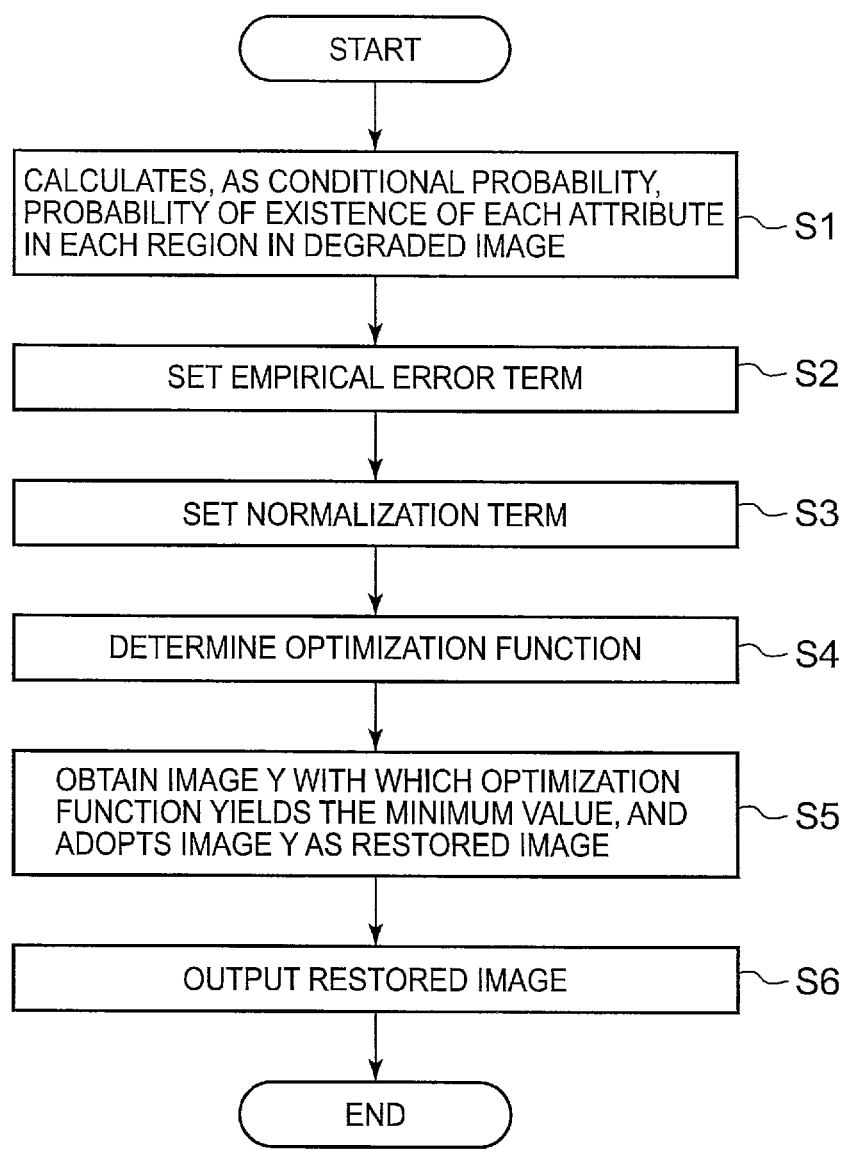
FIG. 7 It depicts a flowchart illustrating an example of progress of processing performed by the image processing apparatus according to the present invention.

FIG. 7 is a flowchart illustrating an example of progress of processing performed by the image processing apparatus according to the present invention. When the degraded image input unit 10 receives the degraded image X, first, the attribute probability calculation unit 11 calculates, as the conditional probability P ($A_i$|X, R), the probability of existence of each attribute in each region in the degraded image X (step S1).

Figure 8:
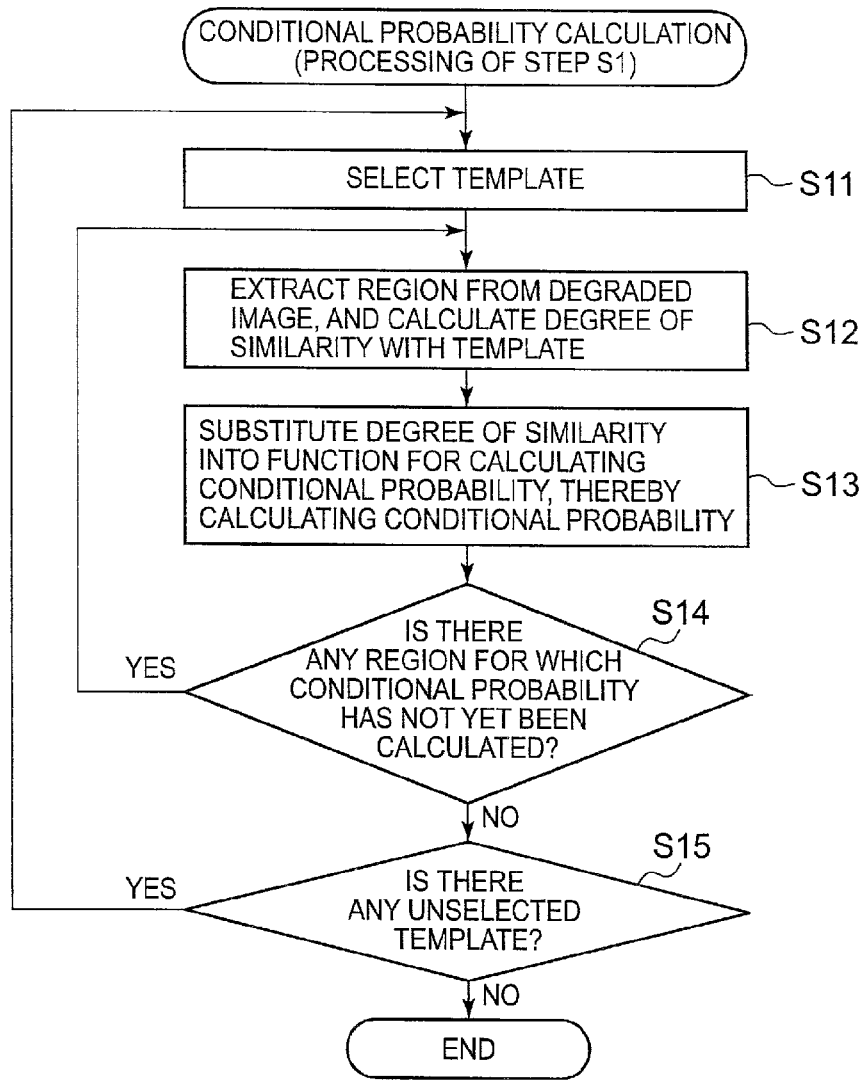
FIG. 8 It depicts a flowchart illustrating an example of progress of processing of calculation of a conditional probability.

FIG. 8 is a flowchart illustrating an example of progress of processing of calculation of a conditional probability (step S1). In step S1, the attribute probability calculation unit 11 selects one of templates (step S11). The template is an image or a filter prepared for each attribute in advance as an image representing an attribute. In step S11, the attribute probability calculation unit 11 selects one of the plurality of templates prepared for the respective attributes.

Subsequently, the attribute probability calculation unit 11 extracts a region R from the input degraded image X, and performs template matching (step S12). More specifically, the attribute probability calculation unit 11 extracts the region R from the degraded image X, and calculates the degree of similarity between the region R and the template. For example, the attribute probability calculation unit 11 may calculate the absolute value of difference of the pixel values for each corresponding pixel of the region R and the template, and may define a reciprocal of a summation thereof as the degree of similarity. Alternatively, the degree of similarity may be calculated by other calculation methods.

It should be noted that the region R may be of the same size as the template, or may be of a different size from the template. When a region R of which size is different from that of the template is extracted, the degree of similarity may be calculated upon enlarging or reducing the region R to the same size as the template (i.e., the same number of pixels as that of the template)

As already explained above, each pixel included in the degraded image R may be adopted as a region R. In this case, in step S12, the attribute probability calculation unit 11 may extract the pixel of the region R and pixels therearound, and may calculate the degree of similarity with the template.

After step S12, the attribute probability calculation unit 11 substitutes the degree of similarity calculated in step S12 into the function of obtaining the conditional probability P ($A_i$|X, R) using the degree of similarity as a variable, thereby calculating the conditional probability P ($A_i$|X, R) (step S13).

The function for obtaining the conditional probability P ($A_i$|X, R) using the degree of similarity as a variable is defined in advance for each attribute. The attribute probability calculation unit 11 may select the function corresponding to the attribute indicated by the template currently selected, and may substitute the degree of similarity into the function.

The function for obtaining the conditional probability P ($A_i$|X, R) may be defined as follows. For example, the common form of the function except parameters may be defined, and the parameters may be determined for each attribute through learning. More specifically, for example, it is assumed that the function for obtaining the conditional probability P ($A_i$|X, R) is a function proportional to the square of the degree of similarity, and a proportionality factor serving as a parameter is different for each attribute. When attention is given to one attribute, a plurality of images in which the attribute exists are prepared as learning data, and correspondence relationship between the degree of similarity obtained from the template matching and the conditional probability P ($A_i$|X, R) is obtained from the learning data, so that the parameter (in this case, the proportionality factor) for the attribute in question is determined. Likewise, the parameters for other attributes may be defined. In this case, it should be noted that, for example, the function for obtaining the conditional probability P ($A_i$|X, R) is determined as the function proportional to the square of the degree of similarity, but the form of the function may be in other forms.

After step S13, the attribute probability calculation unit 11 determines whether, in the degraded image X, there is any region for which the conditional probability P ($A_i$|X, R) has not yet been calculated (step S14). When there is such region (Yes in step S14), the attribute probability calculation unit 11 repeats processing of step S12 and subsequent steps. When there is no such region (No in step S14), the attribute probability calculation unit 11 determines whether there is any unselected template or not (step S15). When is an unselected template (Yes in step S15), the attribute probability calculation unit 11 repeats processing of step S11 and subsequent steps. When there is no unselected template (No in step S15), the attribute probability calculation unit 11 terminates the processing of step S1. As a result, the conditional probability P ($A_i$|X, R) can be obtained for each region of the degraded image X for each attribute.

Although FIG. 8 shows an example where the template matching is performed, the method for calculating the conditional probability P ($A_i$|X, R) is not limited to the method as shown in FIG. 8, and it is also possible to calculate the conditional probability P ($A_i$|X, R) by other calculation methods.

After step S1, as shown in the expression (1), the empirical error setting unit 121 of the optimization function determining unit 12 defines the empirical error term $E_{data}(Y, X)$ (see step S2, FIG. 7). The matrix B in the expression (1) (i.e., the matrix B representing the progress of degradation of the restored image) may be defined in advance.

Subsequently, the normalization term setting unit 122 defines the normalization term $E_{reg}(Y)$(step S3). In step S3, for example, the normalization term setting unit 122 defines, for each attribute, the evaluation function $E_i(Y)$ as shown in the expression (4), and the normalization term setting unit 122 may define the normalization term $E_{reg}(Y)$ as shown in the expression (2) as a summation of the evaluation functions $E_i(Y)$ of the respective attributes.

Subsequently, as shown in the expression (5), the optimization function configuration unit 123 defines the optimization function E(Y) as a summation of the empirical error term $E_{data}(Y, X)$ and the normalization term $E_{reg}(Y)$ (step S4).

Subsequently, the optimization processing unit 13 obtains Y with which the optimization function E(Y) determined by the optimization function configuration unit 123 yields the minimum value, and adopts the image Y as the restored image of the degraded image X (step S5). In step S5, the optimization processing unit 13 may obtain Y with which the optimization function E(Y) yields the minimum using gradient method, for example.

Subsequently, the optimization processing unit 13 outputs the restored image determined in step S5 to the restored image output unit 14 (step S6). For example, the optimization processing unit 13 displays the restored image on the restored image output unit 14.

According to the present invention, the conditional probability $P(A_i|X, R)$ is obtained from the degraded image X, and the optimization function E(Y) is determined using the degraded image X, the conditional probability $P(A_i|X, R)$, and the a-priori knowledge $P(Y|A_i, R)$ respectively determined for the plurality of types of attributes. Then, Y with which the optimization function E(Y) yields the minimum value is determined as the restored image. Therefore, without being limited to only degraded images obtained by taking pictures of particular subjects, and high-quality restored images can be obtained. Since the conditional probability $P(A_i|X, R)$ is calculated, the a-priori knowledge $P(Y|A_i, R)$ for each attribute can be used, and the optimization function E(Y) is defined from the plurality of pieces of a-priori knowledge, so that this allows restoration of a generally-available image into a high-quality restored image.

Subsequently, a modification of the above embodiment will be explained.

In the above embodiment, the normalization term setting unit 122 defines the evaluation function $E_i(Y)$ for the i-th attribute $A_i$ as shown in the expression (4). However, the evaluation function $E_i(Y)$ is not limited to the expression (4). For example, the normalization term setting unit 122 may define the evaluation function $E_i(Y)$ of the i-th attribute $A_i$ as shown in the expression (6) below.

[Math. 5]

$$E_i(Y) = -\Sigma_R \log \{P(A_i|X,R) \cdot P(Y|A_i,R)\} \qquad \text{Expression (6)}$$

In the example of the expression (6), the decreasing function of the conditional probability $P(A_i|X, R)$ and the a-priori knowledge $P(Y|A_i, R)$ defined for each region R is $-\log\{P(A_i|X,R) \cdot P(Y|A_i, R)\}$. A summation of the functions of the respective regions R may be adopted as an evaluation function $E_i(Y)$ as shown in the expression (6).

The normalization term setting unit 122 may also define the evaluation function $E_i(Y)$ according to the expression (7) as shown below.

[Math. 6]

$$E_i(Y) = -\Sigma_R P(A_i|X,R) \cdot P(Y|A_i,R) \qquad \text{Expression (7)}$$

In the example of expression (7), the decreasing function of the conditional probability $P(A_i|X, R)$ and the a-priori knowledge $P(Y|A_i, R)$ defined for each region R is $-P(A_i|X, R) \cdot (Y|A_i, R)$. A summation of the functions of the respective regions R may be adopted as an evaluation function $E_i(Y)$ as shown in the expression (7).

The normalization term setting unit 122 may also define the evaluation function $E_i(Y)$ according to the expression (8) as shown below.

[Math. 7]

$$E_i(Y) = -\Sigma_R \log \{P(A_i|X,R)\} \cdot P(Y|A_i,R) \qquad \text{Expression (8)}$$

In the example of expression (8), the decreasing function of the conditional probability $P(A_i|X, R)$ and the a-priori knowledge $P(Y|A_i, R)$ defined for each region R is $-\log\{P(A_i|X, R)\} \cdot P(Y|A_i, R)$. A summation of the functions of the respective regions R may be adopted as an evaluation function $E_i(Y)$ as shown in the expression (8).

As described above, the method for determining the evaluation function $E_i(Y)$ for each attribute is not limited to one method. In any case, as shown in the expression (2), the normalization term setting unit 122 may define the summation of the evaluation functions $E_i(Y)$ of the respective attributes as the normalization term $E_{reg}|(Y)$.

In the above embodiment, the evaluation function is defined for each attribute as the summation of the functions of the respective regions R, and the normalization term $E_{reg}(Y)$ is defined as the summation of the evaluation functions of the respective attributes. Alternatively, the normalization term setting unit 122 may calculate the normalization term $E_{reg}(Y)$ according to the expression (9) as shown below.

[Math. 8]

$$E_{reg}(Y) = -\Sigma_R \log \{\Sigma_i P(A_i|X,R) \cdot P(Y|A_i,R)\} \qquad \text{Expression (9)}$$

In the expression (9), a result obtained by multiplying a logarithm of summation of the functions of the respective attributes by −1 is determined for each region, and the result obtained for each region is adopted as a normalization term $E_{reg}(Y)$. In the example of the expression (9), $P(A_i|X, R) \cdot P(Y|A_i, R)$ is defined as function for defined for each attribute, and a logarithm of summation of the functions defined for the respective attributes is obtained.

In the above embodiment, as shown in the expression (5), the optimization function configuration unit 123 defines the optimization function E(Y) as the summation of the empirical error term and the normalization term. Alternatively, the optimization function E(Y) may be defined as a weighted sum of the empirical error term and the normalization term. More specifically, the optimization function E(Y) may be defined according to the expression (10) as shown below.

$$E(Y) = E_{data}(Y,X) + \lambda \cdot E_{reg}(Y) \qquad \text{Expression (10)}$$

In the expression (10), $\lambda$ is a weighting factor indicating the weight of the normalization term, and is defined in advance. When it is known in advance that the degree of degradation of the received degraded image X is low, $\lambda$ may be defined as a small value, and the weight of the normalization term may be reduced. On the contrary, when it is known in advance that the degree of degradation of the received degraded image X is high, λ may be defined as a large value, and the weight of the normalization term may be increased. Since the optimization function E(Y) is defined as the weighted sum of the empirical error term and the normalization term, a more appropriate restored image can be obtained according to the degree of degradation of the received degraded image.

Figure 9:
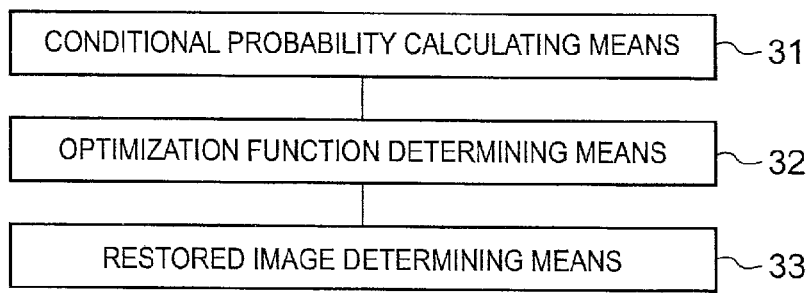
FIG. 9 It depicts a block diagram illustrating an example of a minimum configuration of the present invention.

Subsequently, the minimum configuration of the present invention will be explained. FIG. 9 is a block diagram illustrating an example of the minimum configuration of the present invention. The image processing apparatus according to the present invention includes conditional probability calculating means 31, optimization function determining means 32, and restored image determining means 33.

The conditional probability calculating means 31 (for example, the attribute probability calculation unit 11) calculates, as a conditional probability, a probability of existence of an attribute in each region in an input degraded image for each attribute, i.e., an element defined in advance as an element that can exist within the degraded image.

The optimization function determining means 32 (for example, the optimization function determining unit 12) uses the conditional probability calculated by the conditional probability calculating means 31 with regard to each region in the degraded image for each attribute, a-priori knowledge defined as a conditional probability of appearance of an attribute in a region of a candidate of the restored image when there is the attribute in the region, and the input degraded image to determine an optimization function using the candidate of the restored image as a variable and yielding a smaller value as the candidate of the restored image is closer to the true restored image.

The restored image determining means 33 (for example, the optimization processing unit 13) identifies the candidate of the restored image with which the optimization function yields the minimum value, and adopts the candidate as the restored image of the degraded image.

According to such configuration, without being limited to only degraded images obtained by taking pictures of particular subjects, high-quality restored images can be restored from a generally-available image.

The above embodiment discloses distinctive configurations of the image processing apparatus as described in (Supplementary note 1) to (Supplementary note 12) below.

(Supplementary Note 1)

An image processing apparatus including conditional probability calculating means (for example, the attribute probability calculation unit 11) for calculating, as a conditional probability, a probability of existence of an attribute with regard to each region in an input degraded image, for each attribute, i.e., an element defined in advance as an element that can exist within the degraded image, optimization function determining means (for example, the optimization function determining unit 12) for using a conditional probability calculated by the conditional probability calculating means with regard to each region in the degraded image for each attribute, a-priori knowledge defined as a conditional probability of appearance of an attribute in a region of a candidate of a restored image when there is the attribute in the region, and the input degraded image to determine an optimization function using the candidate of the restored image as a variable and yielding a smaller value as the candidate of the restored image is closer to a true restored image, and restored image determining means (for example, the optimization processing unit 13) for identifying the candidate of the restored image with which the optimization function yields a minimum value, and adopting the candidate as the restored image of the degraded image.

(Supplementary Note 2)

The image processing apparatus according to supplementary note 1, wherein the optimization function determining means includes first term setting means (for example, the empirical error term setting unit 121) for defining a first term (for example, $E_{data}(Y, X)$ of the expression (1)), i.e., a term representing a difference between the actually input degraded image X and an image that degraded a candidate Y of the restored image, second term setting means (for example, the normalization term setting unit 122 for defining $E_{reg}(Y)$ of the expression (2)) for defining, for each region, a decreasing function of the a-priori knowledge and the conditional probability calculated by the conditional probability calculating means, defining a function of each attribute as a summation of decreasing functions of the respective regions, and defining a summation of the functions defined with regard to the respective attributes as second term, and optimization function configuration means (for example, the optimization function configuration unit 123) for defining a summation of the first term and the second term as an optimization function.

(Supplementary Note 3)

The image processing apparatus according to supplementary note 1, wherein the optimization function determining means includes first term setting means (for example, the empirical error term setting unit 121) for defining a first term (for example, $E_{data}(Y, X)$ of the expression (1)), i.e., a term representing a difference between the actually input degraded image X and an image that degraded a candidate Y of the restored image, second term setting means (for example, the normalization term setting unit 122 for defining $E_{reg}(Y)$ in the expression (9)) for defining, for each region, a function for performing a predetermined operation on a summation of functions defined for respective attributes and defining a summation of the functions defined for the respective regions as second term, and optimization function configuration means (for example, the optimization function configuration unit 123) for defining a summation of the first term and the second term as an optimization function.

(Supplementary Note 4)

The image processing apparatus according to supplementary note 2 or supplementary note 3, wherein the optimization function configuration means defines a weighted sum of the first term and the second term as an optimization function.

(Supplementary Note 5)

The image processing apparatus according to any one of supplementary note 2 to supplementary note 4, wherein the first term setting means defines the first term as a term representing a difference between the degraded image and a result obtained by performing operation indicating image degradation process with regard to the candidate Y of the restored image.

(Supplementary Note 6)

The image processing apparatus according to any one of supplementary note 1 to supplementary note 5 further including a-priori possibility storage means (for example, the a-priori knowledge storage unit 15) for storing a-priori possibility defined in advance.

(Supplementary Note 7)

An image processing apparatus including a conditional probability calculating unit (for example, the attribute probability calculation unit 11) for calculating, as a conditional probability, a probability of existence of an attribute with regard to each region in an input degraded image, for each attribute, i.e., an element defined in advance as an element that can exist within the degraded image, an optimization function determining unit (for example, the optimization function determining unit 12) for using a conditional probability calculated by the conditional probability calculating unit with regard to each region in the degraded image for each attribute, a-priori knowledge defined as a conditional probability of appearance of an attribute in a region of a candidate of a restored image when there is the attribute in the region, and the input degraded image to determine an optimization function using the candidate of the restored image as a variable and yielding a smaller value as the candidate of the restored image is closer to a true restored image, and a restored image determining unit (for example, the optimization processing unit 13) for identifying the candidate of the restored image with which the optimization function yields a minimum value, and adopting the candidate as the restored image of the degraded image.

(Supplementary Note 8)

The image processing apparatus according to supplementary note 7, wherein the optimization function determining unit includes a first term setting unit (for example, the empirical error term setting unit 121) for defining a first term (for example, $E_{data}(Y, X)$ of the expression (1)), i.e., a term representing a difference between the actually input degraded image X and an image that degraded a candidate Y of the restored image, a second term setting unit (for example, the normalization term setting unit 122 for defining $E_{reg}(Y)$ of the expression (2)) for defining, for each region, a decreasing function of the a-priori knowledge and the conditional probability calculated by the conditional probability calculating unit, defining a function of each attribute as a summation of decreasing functions for the respective regions, and defining a summation of the functions defined with regard to the respective attributes as second term, and an optimization function configuration unit (for example, the optimization function configuration unit 123) for defining a summation of the first term and the second term as an optimization function.

(Supplementary Note 9)

The image processing apparatus according to supplementary note 7, wherein the optimization function determining unit includes a first term setting unit (for example, the empirical error term setting unit 121) for defining a first term (for example, $E_{data}(Y, X)$ of the expression (1)), i.e., a term representing a difference between the actually input degraded image X and an image that degraded a candidate Y of the restored image, a second term setting unit (for example, the normalization term setting unit 122 for defining $E_{reg}(Y)$ in the expression (9)) for defining, for each region, a function for performing a predetermined operation for a summation of functions defined on respective attributes and defining a summation of the functions defined for the respective regions as second term, and an optimization function configuration unit (for example, the optimization function configuration unit 123) for defining a summation of the first term and the second term as an optimization function.

(Supplementary Note 10)

The image processing apparatus according to supplementary note 8, wherein the optimization function configuration unit defines a weighted sum of the first term and the second term as an optimization function.

(Supplementary Note 11)

The image processing apparatus according to supplementary note 8, wherein the first term setting unit defines the first term as a term representing a difference between the degraded image and a result obtained by performing operation indicating image degradation process with regard to the candidate Y of the restored image.

(Supplementary Note 12)

The image processing apparatus according to supplementary note 7 further including an a-priori possibility storage unit (for example, the a-priori knowledge storage unit 15) for storing a-priori possibility defined in advance.

The invention of the present application has been hereinabove explained with reference to the embodiment, but the invention of the present application is not limited to the above embodiment. The configuration and the details of the invention of the present application can be changed in various ways which can be understood by a person skilled in the art without deviating from the scope of the invention of the present application.

This application claims the priority based on Japanese patent application No. 2009-213524 filed on Sep. 15, 2009, and all the disclosure thereof is incorporated herein by reference.

INDUSTRIAL APPLICABILITY

The present invention can be preferably applied to an image processing apparatus for restoring a degraded image.

REFERENCE SIGNS LIST

10 degraded image input unit
11 attribute probability calculation unit
12 optimization function determining unit
13 optimization processing unit
14 restored image output unit
15 a-priori knowledge storage unit
121 empirical error term setting unit
122 normalization term setting unit
123 optimization function configuration unit

The invention claimed is:

1. An image processing apparatus comprising:
a conditional probability calculating unit, implemented at least by a hardware including a processor, and which calculates, as a conditional probability, a probability of existence of an attribute with regard to each region in an input degraded image, for each attribute, i.e., an element defined in advance as an element that can exist within the degraded image;
an optimization function determining unit, implemented at least by a hardware including a processor, and which determines an optimization function using a candidate of a restored image as a variable and yielding a smaller value as the candidate of the restored image is closer to a true restored image by using a conditional probability calculated by the conditional probability calculating unit with regard to each region in the degraded image for each attribute, a-priori knowledge defined as a conditional probability of appearance of an attribute in a region of the candidate of the restored image when there is the attribute in the region, and the input degraded image; and
a restored image determining unit, implemented at least by a hardware including a processor, and which identifies the candidate of the restored image with which the optimization function yields a minimum value, and adopting the candidate as the restored image of the degraded image,
wherein the conditional probability calculating unit, for each region and for each attribute,
selects a template, being an image or a filter prepared for each attribute, from a plurality of templates,
extracts a region from the input degraded image,
calculates a degree of similarity between the region and the template, and calculates the conditional probability based on the degree of similarity.

2. The image processing apparatus according to claim 1, wherein the optimization function determining unit includes:
a first term setting unit, implemented at least by a hardware including a processor, and which defines a first term, i.e., a term representing a difference between the actually input degraded image X and an image that degraded a candidate Y of the restored image;
a second term setting unit, implemented at least by a hardware including a processor, and which defines, for each region, a decreasing function of the a-priori knowledge and the conditional probability calculated by the conditional probability calculating unit, defining a function of each attribute as a summation of decreasing functions of the respective regions, and defining a summation of the functions defined with regard to the respective attributes as second term; and
an optimization function configuration unit, implemented at least by a hardware including a processor, and which defines a summation of the first term and the second term as an optimization function.

3. The image processing apparatus according to claim 1, wherein the optimization function determining unit includes:
a first term setting unit, implemented at least by a hardware including a processor, and which defines a first term, i.e., a term representing a difference between the actually input degraded image X and an image that degraded a candidate Y of the restored image;
a second term setting unit, implemented at least by a hardware including a processor, and which defines, for each region, a function for performing a predetermined operation for a summation of functions defined for respective attributes and defining a summation of the functions defined for the respective regions as second term; and
an optimization function configuration unit, implemented at least by a hardware including a processor, and which defines a summation of the first term and the second term as an optimization function.

4. The image processing apparatus according claim 2, wherein the optimization function configuration unit defines a weighted sum of the first term and the second term as an optimization function.

5. The image processing apparatus according to claim 2, wherein the first term setting unit defines the first term as a term representing a difference between the degraded image and a result obtained by performing operation indicating image degradation process with regard to the candidate Y of the restored image.

6. The image processing apparatus according to claim 1, further comprising a-priori possibility storage unit, implemented by a storage device, and which stores a-priori possibility defined in advance.

7. An image processing method comprising:
calculating, as a conditional probability, a probability of existence of an attribute with regard to each region in an input degraded image, for each attribute, i.e., an element defined in advance as an element that can exist within the degraded image;
determining an optimization function as a variable and yielding a smaller value as a candidate of the restored image is closer to a true restored image by using a conditional probability calculated with regard to each region in the degraded image for each attribute, a-priori knowledge defined as a conditional probability of appearance of an attribute in a region of the candidate of the restored image when there is the attribute in the region, and the input degraded image; and
identifying the candidate of the restored image with which the optimization function yields a minimum value to adopt the candidate as the restored image of the degraded image,
wherein when calculating the conditional probability, for each region and for each attribute,
selecting a template, being an image or a filter prepared for each attribute, from a plurality of templates,
extracting a region from the input degraded image,
calculating a degree of similarity between the region and the template, and
calculating the conditional probability based on the degree of similarity.

8. The image processing method according to claim 7, wherein when the optimization function is determined,
defining a first term, i.e., a term representing a difference between the actually input degraded image X and an image that degraded a candidate Y of the restored image;
defining, for each region, a decreasing function of the a-priori knowledge and the conditional probability calculated with regard to each region in the degraded image for each attribute, defining a function of each attribute as a summation of decreasing functions of the respective regions, and defining a summation of the functions defined with regard to the respective attributes as second term; and
defining a summation of the first term and the second term as an optimization function.

9. The image processing method according to claim 7, wherein when the optimization function is determined,
defining a first term, i.e., a term representing a difference between the actually input degraded image X and an image that degraded a candidate Y of the restored image;
defining, for each region, a function for performing a predetermined operation on a summation of functions defined for respective attributes and defining a summation of the functions defined for the respective regions as second term; and
defining a summation of the first term and the second term as an optimization function.

10. A non-transitory computer readable information recording medium that has stored thereon an image processing program, said image processing program comprising programming code that, when executed by a processor, causes the processor to perform a method of:
calculating, as a conditional probability, a probability of existence of an attribute with regard to each region in an input degraded image, for each attribute, i.e., an element defined in advance as an element that can exist within the degraded image;
determining an optimization function as a variable and yielding a smaller value as a candidate of the restored image is closer to a true restored image by using a conditional probability calculated with regard to each region in the degraded image for each attribute, a-priori knowledge defined as a conditional probability of appearance of an attribute in a region of the candidate of the restored image when there is the attribute in the region, and the input degraded image; and
identifying the candidate of the restored image with which the optimization function yields a minimum value, and adopting the candidate as the restored image of the degraded image,
wherein when calculating the conditional probability, for each region and for each attribute, selecting a template, being an image or a filter prepared for each attribute, from a plurality of templates, extracting a region from the input degraded image, calculating a degree of similarity between the region and the template, and calculating the conditional probability based on the degree of similarity.

11. The non-transitory computer readable information recording medium according to claim 10, wherein the programming code, when executed by the processor, further causes the processor to perform:

defining a first term, i.e., a term representing a difference between the actually input degraded image X and an image that degraded a candidate Y of the restored image;

defining, for each region, a decreasing function of the a-priori knowledge and the conditional probability calculated in the conditional probability calculating processing, defining a function of each attribute as a summation of decreasing functions of the respective regions, and defining a summation of the functions defined with regard to the respective attributes as second term; and defining a summation of the first term and the second term as an optimization function.

12. The non-transitory computer readable information recording medium according to claim 10, wherein the programming code, when executed by the processor, further causes the processor to perform:

defining a first term, i.e., a term representing a difference between the actually input degraded image X and an image that degraded a candidate Y of the restored image;

defining, for each region, a function for performing a predetermined operation on a summation of functions defined for respective attributes and defining a summation of the functions defined for the respective regions as second term; and defining a summation of the first term and the second term as an optimization function.

* * * * *